Patented Nov. 13, 1951

2,574,987

UNITED STATES PATENT OFFICE 2,574,987

STABILIZATION OF VINYL RESIN COMPOSITIONS

Thomas H. Shelley, Spotswood, N. J., assignor to
The B. F. Goodrich Company, New York, N. Y.,
a corporation of New York No Drawing. Application March 10, 1950,
Serial No. 149,012

14 Claims. (Cl. 260—45.8)

This invention relates to light and heat stable polymer compositions and to the preparation of such compositions, and relates particularly to synthetic resin compositions containing a polymer of vinyl or vinylidene chloride together with an organic imide as a stabilizer against the effects of light and heat.

Compositions, including vinyl chloride and vinylidene chloride polymers and copolymers thereof with other polymerizable materials, although substantially clear when first prepared, tend to deteriorate and darken in the presence of light or heat. Such compositions are of lessened value in applications where light and heat stability are important considerations, for example, where the compositions are to be exposed to the action of the weather for relatively long periods of time.

Accordingly, it is an object of the present invention to provide vinyl and vinylidene chloride polymer compositions which exhibit a high degree of stability when exposed to the influence of light and/or heat. Other objects will be apparent from the description which follows.

I have now discovered that the above and other objects are readily attained by incorporating in the polymer composition a small quantity of an organic imide. In this manner polymer compositions are obtained which have a high resistance to deterioration under the action of light or heat or both.

The compositions which are stabilized by organic imides in accordance with this invention comprise homopolymers of a chloroethylene containing 1 to 2 chlorine atoms attached to one only of the carbon atoms, that is, vinyl and vinylidene chloride, copolymers of such chloroethylenes with each other and copolymers of such chloroethylenes preferably in predominant amounts with other materials copolymerizable therewith such as vinyl bromide, vinyl acetate, vinyl propionate, vinyl butyrate, vinyl chloroacetate, vinylidene bromide, vinylidene chlorofluoride, dimethyl fumarate, dimethyl maleate, dibutyl maleate, diethyl chloromaleate, methyl acrylate, 2-ethylhexyl acrylate, n-octyl acrylate, isononyl acrylate, decyl acrylate, methyl methacrylate, methyl ethacrylate, and the like.

Organic imides also effectively stabilize polymers prepared from three or more polymerizable materials, for example, such as tripolymers of vinyl or vinylidene chloride, a higher acrylate such as n-octyl acrylate, and a third monomer such as acrylonitrile, styrene, vinyl acetate, vinyl benzoate, isobutylene or the like. High molecular weight polymers of vinyl chloride such as gamma polyvinyl chloride are especially effectively stabilized by organic imides.

The organic imides which are useful as light and heat stabilizers for vinyl resins possess the characteristic imide structure

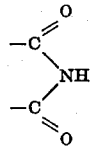

both free valences on the carbon atoms being attached to hydrocarbon structure. More particularly, such organic imides may be of two specific types:

(1) imides of the structure

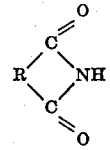

wherein R is a hydrocarbon radical, either saturated or unsaturated. Included within this class of imides are maleinimide, phenylmaleinimide, malonimide, succinimide, glutarimide, adipimide, sebacimide, vinyl succinimide, phthalimide, itaconimide, citraconimide, methylitaconimide, naphthalene tetracarboxylic acid imide, acenaphthene-5,6-dicarboxylic acid imide, alpha, beta-diethyl succinimide and the like. Especially preferred imides of this class are those in which the R is saturated, preferably polymethylene, and contains from 2 to 4 carbon atoms. Imides which possess the above structure are readily prepared by removing a molecule of water from the half amide of the corresponding dicarboxylic acid, by reacting an amine with an acid anhydride such as phthalic anhydride, or by various other conventional methods.

(2) imides possessing the structure

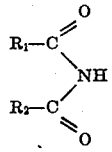

wherein $R_1$ and $R_2$ are hydrocarbon radicals, saturated or unsaturated, and may be the same or different. Included within this class of compounds are dimethylimide, diethylimide, dipropylimide, didecylimide, ethylpropylimide, methylhexylimide, methylphenylimide, diphenylimide, dinaphthylimide, propylnaphthylimide, dibenzylimide, propylbenzylimide, and the like. The preferred imides of this class are those in which $R_1$ and $R_2$ contain from 1 to 10 carbon atoms and especially those wherein $R_1$ and $R_2$ are both alkyl radicals. Imides of this second class are prepared by reacting an amine with an acid chloride whereby hydrogen chloride is split off to give an amide, and reacting the amide with an acid chloride to give the imide, or by reacting a nitrile with an aliphatic carboxylic acid. Other conventional manners of preparation may also be utilized.

The particular proportion of organic imide employed is not critical, as little as 0.1% of the imide or even less based on the weight of the polymer being effective. Also, as much 5% of the imide or more by weight of the polymer may be used, with the especially preferred range being from 0.1% to 3.0% by weight of the polymer. Although amounts greater than 5% may also be utilized, it is usually neither necessary nor desirable to use more because any further addition will not tend to increase the light and heat stability to any appreciable degree and, in fact may be detrimental in that other physical properties of the composition such as hardness and low temperature flexibility may be adversely affected.

The organic imide stabilizers of this invention are useful with either plasticized or unplasticized compositions, but they are particularly valuable with compositions containing both polymer and plasticizer. The stabilizers may be added to the composition either before or after the plasticizer is added, or they may be dispersed or dissolved in a plasticizer prior to incorporation of the latter in the polymer composition. The amount of plasticizer used, of course, will depend upon the properties of the particular polymer and plasticizer as well as upon the properties desired in the finished composition and may vary from 20 to 600 parts by weight of the plasticizer for each 100 parts of polymer, usually being from 20 to 80 parts of plasticizer for each 100 parts of polymer.

Among the plasticizers which may be utilized are included tricresyl phosphate, dibutyl phthalate, butyl phthalyl butyl glycollate, dioctyl phthalates such as di-2-ethylhexyl phthalate, dibutyl sebacate, undecyl tetrahydro naphthyl ketone, and various chlorinated or nitrated aromatic compounds, aromatic or long-chain aliphatic esters, ethers or ketones, esters of inorganic acids or mixed aromatic aliphatic compounds, and the like.

The following examples will illustrate more fully the practice of this invention.

*Example I*

Compositions are prepared having the following ingredients in parts by weight:

|  | A | B | C | D |
|---|---|---|---|---|
| Polyvinyl chloride | 100 | 100 | 100 | 100 |
| Dioctyl phthalate | 50 | 50 | 50 | 50 |
| Succinimide | 0.1 | 1.0 | 3.0 | 0.0 |

These compounded compositions are molded for 3 minutes at 355° F. and cut in 6"x1"x0.02" clear strips which are exposed to an accelerated weathering test in a weatherometer which simulates actual weathering conditions, by utilizing ultra violet light, moisture, heat and by a circulating air oven. The samples are examined after 1, 5 and 9 days; at the end of 9 days the control sample D is a very dark brown color while stabilized samples A, B and C are substantially clear.

A second set of samples of the same compositions are heated to 150° C. Control sample D darkens badly after only one hour of heating while samples A, B and C do not darken appreciably even after being heated for 2 hours.

*Example II*

Example I is repeated except that phthalimide is substituted for the succinimide. The stocks thus prepared are equivalent to the succinimide stabilized stocks in their ability to withstand the effects of light and heat.

The data given in the examples has been substantiated by tests in natural sunlight and outdoor weather conditions.

Moreover, when the examples are repeated utilizing other of the organic imides disclosed hereinabove, for example, diphenylimide, glutarimide, diethylimide, and maleinimide, the light and heat stabilizing effects obtained are generally equivalent to those shown in the examples. Also, when imides are incorporated in more highly plasticized stocks and completely unplasticized stocks, excellent light and heat stability is obtained. Increased resistance to oven blackening is a very important property of the highly plasticized compositions, since these compositions are often used for molds to cast plaster and other like substances and it becomes frequently desirable to melt and recast a mold many times during the life of the composition.

Any of the usual pigments, fillers, dyes, and the like may be added to the compositions of this invention in order to give varied physical properties.

The addition of organic imide stabilizers to polymeric vinyl and vinylidene chloride compositions greatly reduces the aging by sunlight and heat which is evidenced by discoloration, cracking, and hardening of the composition. Although heretofore compositions containing no organic imide stabilizer have been utilized in the preparation of various articles of manufacture, stabilization of the compositions of this invention by adding organic imides thereto makes it possible to increase the wide use of vinyl and vinylidene chloride resin compositions in many outdoor or indoor uses such as umbrellas, raincoats, auto tops, upholstery materials and the like.

Although specific embodiments of the invention have been disclosed herein, it is not intended to limit the invention solely thereto, but to include all of the obvious variations and modifications falling within the spirit and scope of the appended claims.

I claim:

1. A light and heat stable composition comprising predominantly a polymer of a chloroethylene having from 1 to 2 chlorine atoms attached to one only of the carbon atoms, and an organic imide containing the grouping

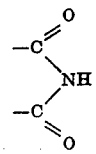

wherein both free valences on the carbon atoms are attached to hydrocarbon structure.

2. A light and heat stable composition comprising predominantly a polymer of a chloroethylene having from 1 to 2 chlorine atoms attached to one only of the carbon atoms, a plasticizer therefor, and from 0.1% to 5% by weight of the polymer of an organic imide of the structure

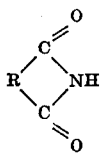

wherein R is a hydrocarbon radical.

3. A light and heat stable composition comprising predominantly a polymer of a chloroethylene having from 1 to 2 chlorine atoms attached to one only of the carbon atoms, a plasticizer therefor, and from 0.1% to 5% by weight of the polymer of an organic imide of the structure

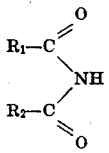

wherein $R_1$ and $R_2$ are hydrocarbon radicals.

4. A light and heat stable composition comprising predominantly a polymer of vinyl chloride, a plasticizer therefor, and from 0.1% to 3% by weight of the polymer of an organic imide of the structure

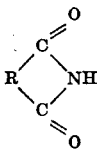

wherein R is a saturated alkylene radical containing from 2 to 4 carbon atoms.

5. A light and heat stable composition comprising predominantly a polymer of vinyl chloride, a plasticizer therefor, and from 0.1% to 3% by weight of the polymer of an organic imide of the structure

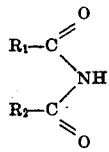

wherein $R_1$ and $R_2$ are hydrocarbon radicals containing from 1 to 10 carbon atoms.

6. A light and heat stable composition comprising 100 parts by weight of polyvinyl chloride, a plasticizer therefor, and from 0.1 to 3.0 parts by weight succinimide.

7. A light and heat stable composition comprising 100 parts by weight of polyvinyl chloride, a plasticizer therefor, and from 0.1 to 3.0 parts by weight of phthalimide.

8. A method of light and heat-stabilizing compositions comprising predominantly a polymer of a chloroethylene having from 1 to 2 chlorine atoms attached to one only of the carbon atoms, which comprises adding to said composition an organic imide containing the grouping

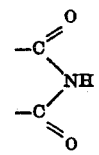

wherein both free valences on the carbon atoms are attached to hydrocarbon structure.

9. A method of light and heat-stabilizing compositions comprising predominantly a polymer of a chloroethylene having from 1 to 2 chlorine atoms attached to one only of the carbon atoms, which comprises adding to said composition from 0.1% to 5.0% by weight of the polymer of an organic imide possessing the structure

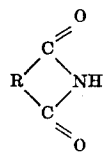

wherein R is a hydrocarbon radical.

10. A method of light and heat-stabilizing compositions comprising predominantly a polymer of a chloroethylene having from 1 to 2 chlorine atoms attached to one only of the carbon atoms, which comprises adding to said composition from 0.1% to 5.0% by weight of the polymer of an organic imide possessing the structure

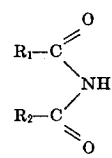

wherein $R_1$ and $R_2$ are hydrocarbon radicals.

11. A method of heat and light-stabilizing compositions comprising predominantly a polymer of vinyl chloride, which comprises adding to said composition from 0.1% to 3.0% by weight of the polymer of an organic imide possessing the structure

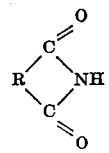

wherein R is a saturated alkylene radical containing from 2 to 4 carbon atoms.

12. A method of heat and light-stabilizing compositions comprising predominantly a polymer of vinyl chloride, which comprises adding to said composition from 0.1% to 3.0% by weight of an organic imide possessing the structure

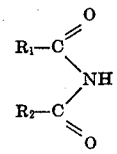

wherein $R_1$ and $R_2$ are hydrocarbon radicals containing from 1 to 10 carbon atoms.

13. A method of light and heat-stabilizing a composition comprising predominantly polyvinyl chloride which comprises adding to said composition from 0.1% to 3.0% by weight of the polymer of succinimide.

14. A method of light and heat-stabilizing a composition comprising predominantly polyvinyl chloride which comprises adding to said composition from 0.1% to 3.0% by weight of the polymer of phthalimide.

THOMAS H. SHELLEY.

REFERENCES CITED

The following references are of record in the file of this patent:

UNITED STATES PATENTS

| Number | Name | Date |
| --- | --- | --- |
| 2,319,953 | Scott | May 25, 1943 |